L. F. Munger,
Permutation Lock.
No. 62.
1,167.
Reissued Apr. 2, 1861.
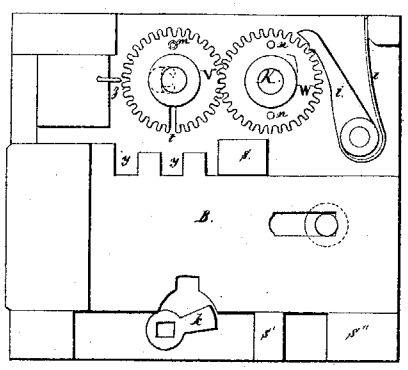
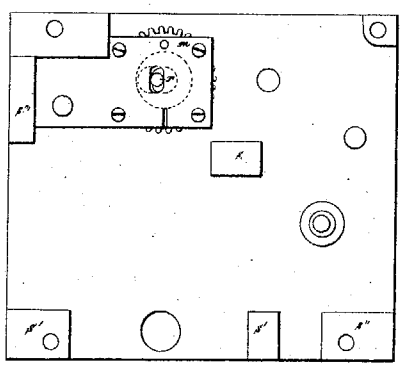
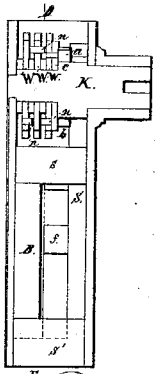
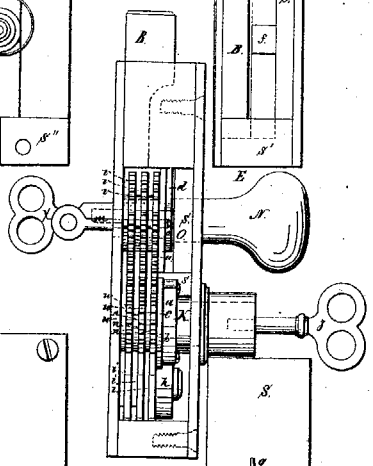
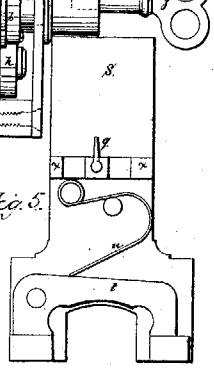
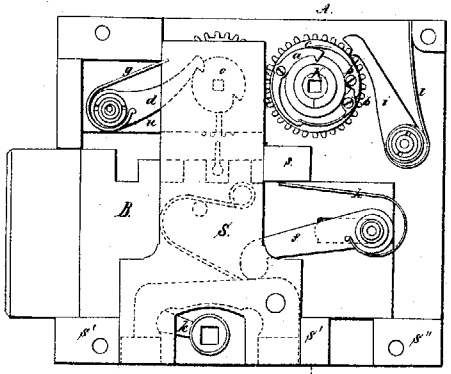
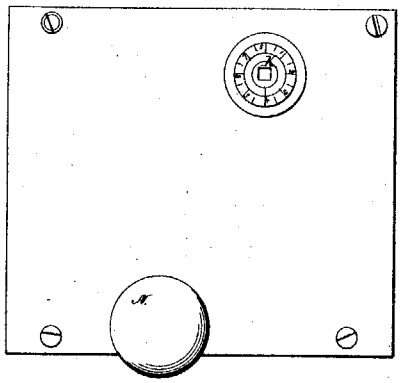
AM. PHOTO-LITHO. CO. N.Y. (OSBORNE'S PROCESS.)

UNITED STATES PATENT OFFICE.

L. F. MUNGER, OF ROCHESTER, NEW YORK.

IMPROVEMENT IN LOCKS.

Specification forming part of Letters Patent No. 17,804, dated July 14, 1857; Reissue No. 1,167, dated April 2, 1861.

*To all whom it may concern:*

Be it known that I, L. F. MUNGER, of Rochester, in the county of Monroe and State of New York, have invented a new and useful Improvement in Locks; and I do hereby declare that the following is a full, clear, and exact description of the same, reference being had to the annexed drawings which make a part of this specification, and in which drawings similar letters of reference indicate corresponding parts.

The nature of this invention consists in certain improved means for effecting those changes in a permutation-lock, which changes are necessary either to allow or prevent the bolt being operated or thrown, and these means will be fully understood by those skilled in the art from the following description of the several parts and their mode of action.

In reference to the drawings, there will be seen—B the bolt of the lock; *k*, the bit of the stationary key, which throws said bolt back and forth; and S, Figure 5, the tumble, which prevents the movement of the bolt B by means of the projections *x x*, which interlock with similar indentations, *y y*, on the bolt. This tumbler is guided vertically by the projections *s s′ s″*, and is constantly forced down by a spring, *b*, acting through a lever, *f*. This lever turns upon a pin at its center of motion, which passes through the bolt B, as seen in Fig. 3. The action of the key is such, however, as to raise this tumbler S (if nothing prevents) before acting on the bolt, thus leaving the bolt free to move back and forth; but the tumbler S has affixed to it a tongue, *q*, which fits into the slot *t* of wheels V, of which there are three in the sample shown in the drawings. If, then, the slots in the three wheels V should all coincide and lie vertically over the tongue *q* attached to the tumbler S, it is evident that said tumbler might be raised by the action of the bit *k* of the key; but if these slots should not all coincide with the line of *q*, then the tumbler could not be raised, and consequently the lock could not be opened.

Thus far the construction of this lock is similar to that of others of its class; and it is in the peculiar means used for bringing the slots *t* into and out of line with the tongue *q* of the tumbler, and with each other, that my invention consists.

Working into each of the wheels V is another set, W, as will be seen from Fig. 3 and the top view on Sheet 2, and the two sets may be thrown into and out of gear with each other by means of the eccentric arbor *r*, constructed as shown in Figs. 3 and 6. This arbor has a square end, (opposite to that seen in Figs. 3 and 6,) by which it may be turned by a key fitting thereon, and when turned the whole is held in position by means of the pawl *d* catching into the notches in the disk O, Fig. 1. Two of the wheels W are fitted loosely on the arbor K, but are prevented from moving freely by means of the pawl *i*, a projection on which drops into the tooth-spaces of said wheels whenever they are in proper position to allow it. The third wheel is attached to the friction-clutch *c a b*, Fig. 1, which attaches it to the arbor K with sufficient force to move all the other wheels, while, at the same time, if any of the wheels should get caught—as, for instance, by the tongue *q*—the arbor might be turned round without any danger of breaking the teeth of the wheels. Each of these wheels W has a pin projecting from its side, (see *n*, Figs. 2, 3, and Sheet 2,) and so placed as to interlock with similar pins in the wheel next to it, the middle wheel having thus, of course, a pin on each side. By means of these pins all the wheels may be caused to revolve, while at the same time, on reversing the motion, each wheel (beginning with the one attached to the clutch) may in succession be caused to make one revolution (less the thickness of the pin) without affecting the one next beyond it.

Such being the general construction and arrangement of the parts just described, the mode of operation is as follows: First, if we have the slots *t* in proper position, but desire to change the relative positions of the wheels W in relation to the wheels V, to themselves, and to the index, Fig. 4, so as to prevent any person but one who knows these positions from opening the lock, having first thrown the wheels V out of gear by means of the eccentric arbor *r*, we turn the arbor K round until, by means of the projecting pins *n* on the several wheels W, all these wheels are caused to revolve. We then bring the index or pointer on this arbor opposite any point on the graduated ring within which it moves, and note its position. Then, reversing the direction of the motion of the arbor K, carry it around one complete revolution, and as much more as may be desired, and then note the figure opposite to which the index on the arbor stands. Again, reverse the motion of the arbor, (beware, however, that it be not carried round a full revolution,) and again note the position of the index as before. If, now, the wheels V be thrown into gear with the wheels W, it is evident that they will still be in a position to allow of the lock being opened, and since they are the same size and pitch as the wheels W, though the latter be turned round ever so much, (and with them the wheels V,) still the whole can at any time be brought into their original position by repeating the process above described. For as each individual wheel is thus brought into position, of course the whole must be, and thus the lock may be opened.

The second condition in which it may be desired to form a new combination, as it is termed, is when a combination has been formed (either by accident or design) of the nature of which we are ignorant, a circumstance which can arise only when the door is open and the lock exposed. To meet this, however, the following process has been devised: The slots *t*, having been brought into proper position to receive the tongue *q*, a hole is bored through the inner plate of the lock and through all the wheels V; if then the combination be at any time lost, all that is necessary is to insert a pin (*m*, Sheet 2,) through the hole in the inner plate of the lock, and press it against the wheel V, while this is slowly revolved. The pin will of course drop into the hole in the first wheel. Reverse the motion, and it may be inserted into the second; and by again reversing the motion the third wheel may be caught. It is obvious that the bolt may now be thrown and a new combination produced, as previously explained.

I do not confine myself to the application of the revolving arbor on which the wheels W are placed, for a rotating arbor may be dispensed with and a stationary one used, the wheels being allowed to rotate on the latter.

Having thus described my invention, what I claim as new, and desire to secure by Letters Patent, is—

1. A series of wheels, W, revolving on a common center, and provided with teeth or indentations at their peripheries for changing their position relatively with other wheels V, or their equivalents, when each of the wheels W aforesaid has a pin projecting from its side or sides, so placed as to interlock with similar pins in the wheel or whee's next adjoining it, to operate substantially as and for the purpose herein set forth.

2. The combination of the wheels W with the wheels V, or their equivalents, when the latter are arranged or placed on an adjustable axis or shaft, specifically as herein shown, for the purpose of connecting and disconnecting the wheels W and the wheels V, or their equivalents, as herein specified.

L. F. MUNGER.

Witnesses:

GEO. P. DRAPER,

DE LANCEY CRITTENDEN.